No. 650,460. Patented May 29, 1900.
H. L. HAFF.
CARRYING ATTACHMENT FOR BICYCLES.
(Application filed Oct. 19, 1899.)
(No Model.) 3 Sheets—Sheet 1.
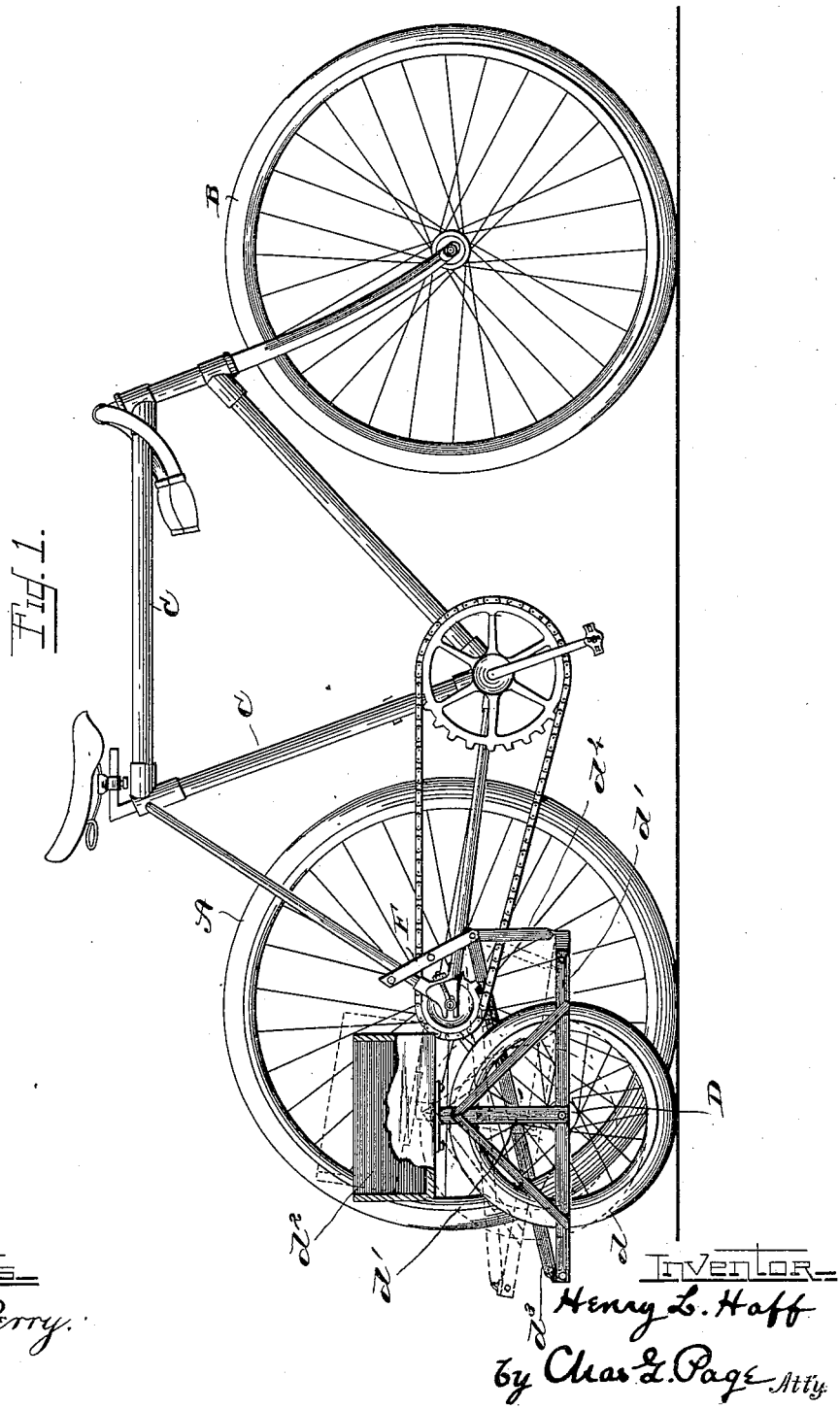

No. 650,460. Patented May 29, 1900.
H. L. HAFF.
CARRYING ATTACHMENT FOR BICYCLES
(Application filed Oct. 19, 1899.)
(No Model.) 3 Sheets—Sheet 2.
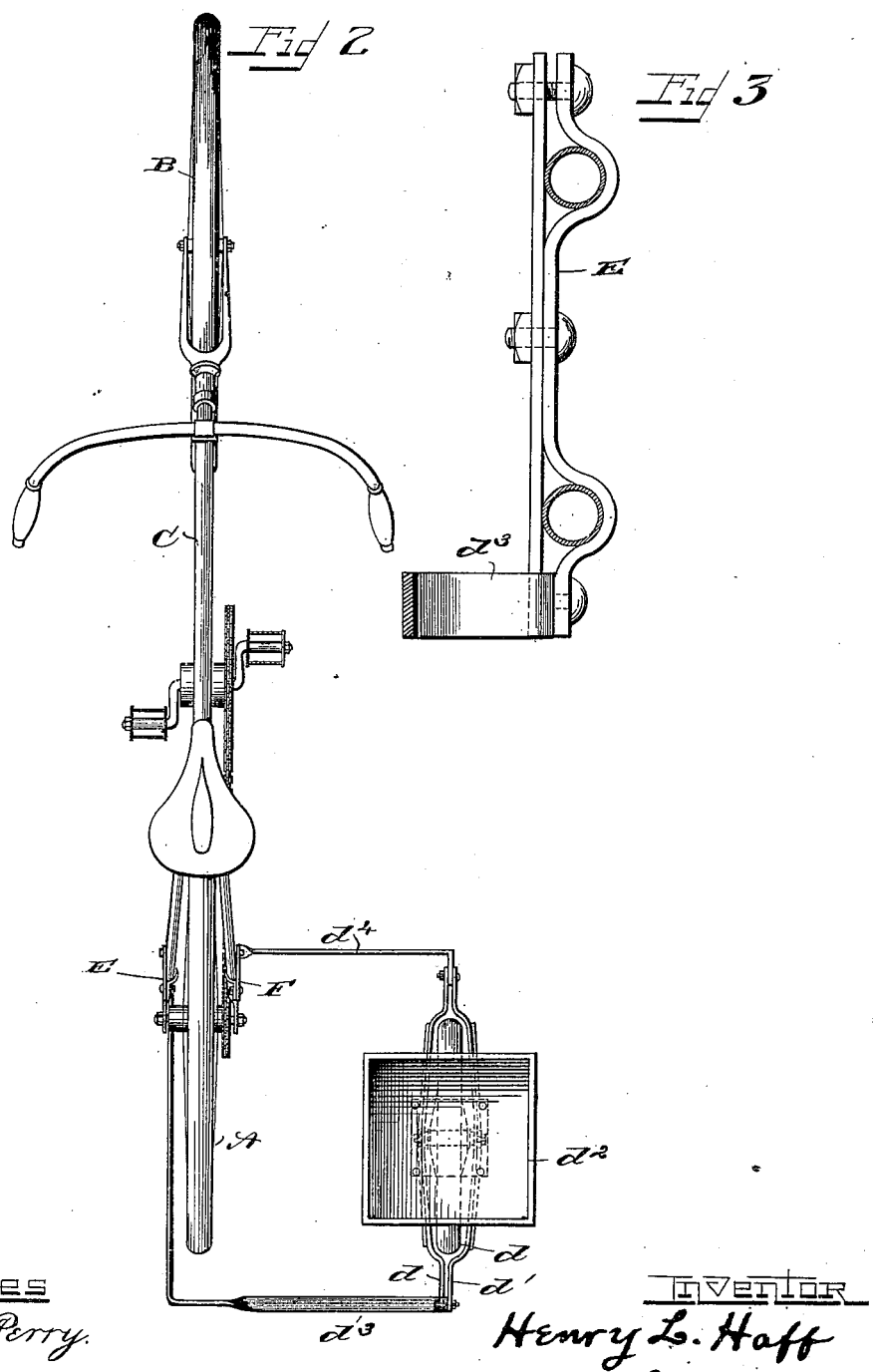
Witnesses
Ira A. Perry.
J B Keir
Inventor
Henry L. Haff
by Chas L. Page Atty.

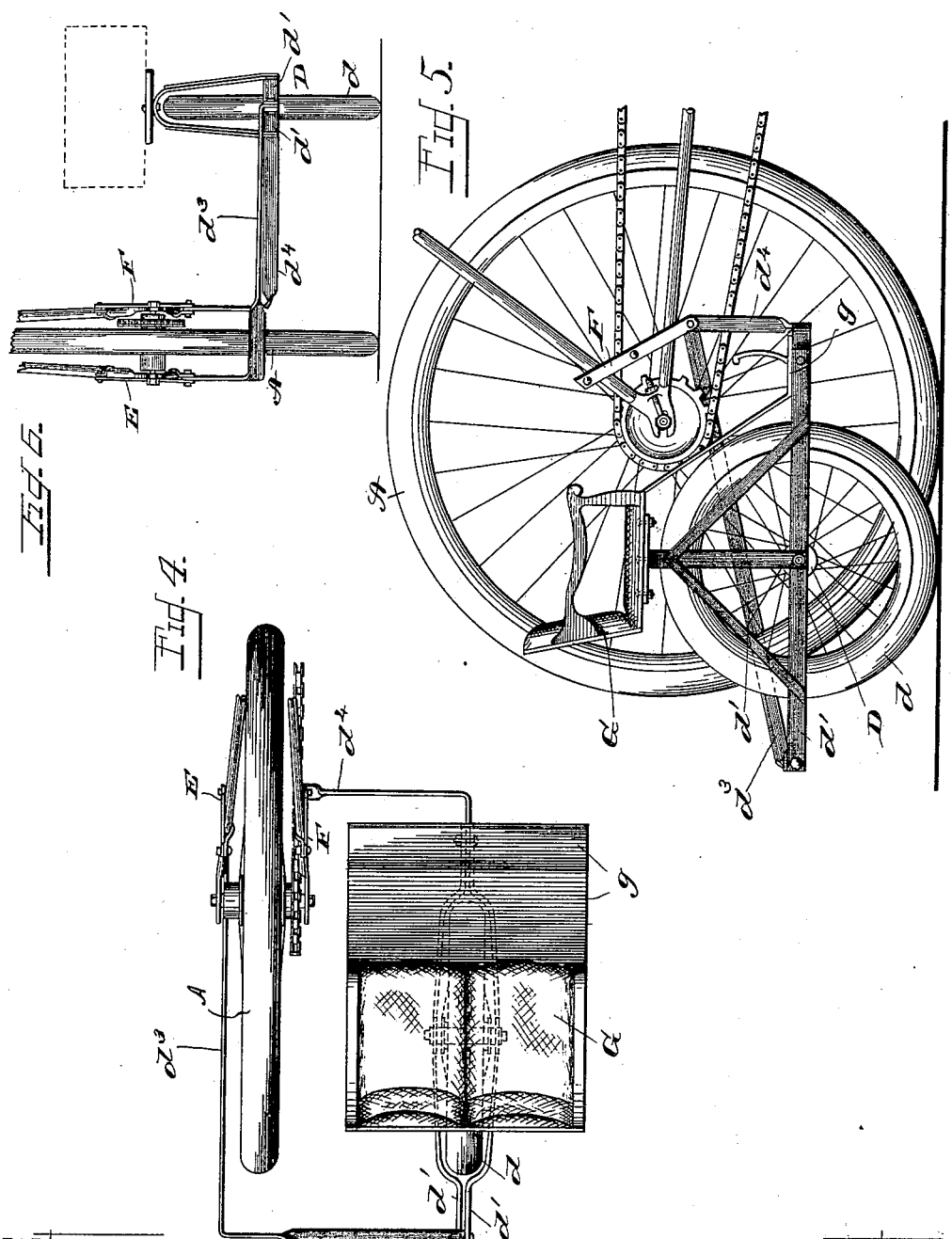

UNITED STATES PATENT OFFICE.

HENRY L. HAFF, OF CHICAGO, ILLINOIS.

CARRYING ATTACHMENT FOR BICYCLES.

SPECIFICATION forming part of Letters Patent No. 650,460, dated May 29, 1900.

Application filed October 19, 1899. Serial No. 734,076. (No model.)

*To all whom it may concern:*

Be it known that I, HENRY L. HAFF, a citizen of the United States, residing at Chicago, county of Cook, State of Illinois, have invented a certain new and useful Improvement in Carrying Attachments for Bicycles, of which the following is a specification.

The objects of my invention are to provide a simple and inexpensive device which can be readily attached to an ordinary bicycle and upon which may be carried either children or packages, to provide a carrying attachment which will not render the riding of the bicycle difficult, to provide a carrying attachment having a wheel which will sustain the weight of the child or package and which will travel smoothly at the side of the bicycle, to provide a wheeled carrying attachment which will not tend to strain the frame or other parts of the bicycle, and to provide certain details and features of improvement tending to render a device of this character serviceable and thoroughly reliable.

To the attainment of the foregoing and other useful ends my invention consists in matters hereinafter set forth and claimed.

In the accompanying drawings, Figure 1 is a side elevation of a bicycle provided with a wheeled carrying attachment constructed in accordance with my invention. Fig. 2 is a plan of the bicycle and carrying attachment shown in Fig. 1. Fig. 3 is a detail view illustrating a simple and effective arrangement for securing the carrying attachment to the frame of a bicycle. Figs. 4 and 5 are respectively a plan and a side elevation of the rear portion of a bicycle with my invention attached and illustrating how the latter may be provided with a seat in lieu of the box shown in preceding views. Fig. 6 is a rear elevation of the bicycle and attachment shown in Fig. 1.

My invention is adapted more particularly for use in connection with bicycles of the safety pattern. It will be readily understood, however, that I do not limit myself to any particular form of velocipede and that I desire to cover my invention as a matter of improvement in velocipede construction and also as an attachment for the latter. In Fig. 1 the bicycle is of the ordinary pattern and is provided with the usual wheels A and B and the frame C, together with the chain, sprockets, and pedals essential to a wheel of this character. The wheeled carrying attachment D comprises a relatively-small wheel $d$, a frame $d'$, and in this instance a box or receptacle $d^2$ for carrying parcels or bundles. The frame $d'$, which supports the box $d^2$, is in turn supported by the wheel $d$, and the latter is arranged to travel at the side of the wheel A. Preferably the rear of the small wheel $d$ is on a line with the rear of the wheel A, or approximately so, and this supplemental wheel can of course be provided with a pneumatic tire and suitable ball-bearings. Thus constructed the wheeled carrier is preferably secured to the frame of the bicycle, and this connection can be effected in any suitable manner—as, for instance, by connecting the frame $d'$ with the frame A by means of a couple of arms $d^3$ and $d^4$. The arm $d^3$, it will be observed, is L-shaped in form and has one end secured to the rear end of the frame $d'$ and its other end secured to a bracket E on the farther side of the machine. A second bracket F is secured to the adjacent side of the bicycle-frame, and the arm $d^4$ has one end secured to this bracket and its opposite end secured to the front end of the frame $d'$. These brackets E and F are secured to the rear portion of the bicycle-frame in the manner illustrated in Fig. 3 and afford a simple and effective means for connecting the wheeled carrier with the frame of the bicycle. Each arm is preferably connected with its bracket by means of a bolt or pivot, and with this arrangement the wheeled carrying attachment will have a pivotal or swinging connection with the bicycle, the axis about which the attachment swings being horizontal and transverse to the length of the bicycle-frame. In this way the carrier will be free to rise and fall independently of the bicycle, an obstruction or rut in the path of the carrier having no other effect than to cause it to swing up or down. This method of connecting the wheeled carrier with the bicycle tends to ease the running of the latter and to relieve it of all lateral strain. The bundles or packages to be carried can be placed within the box or receptacle $d^2$, and their weight will be sustained entirely by the wheel $d$.

The box or receptacle $d^2$ can be made removable, if so desired, and a seat or chair can be secured to the frame in its place. In Figs. 4 and 5 the carrier is provided with a chair G. The latter is adapted to afford a comfortable seat for a child and is provided with a foot-rest g. It will be seen, therefore, that I provide an exceedingly simple and inexpensive carrying attachment for bicycles or other velocipedes, that the same can be readily attached to a bicycle, that the method of attachment is such that the velocipede-frame will not be subjected to severe strain, and also that the device is capable of carrying either children or parcels.

What I claim as my invention is—

1. A carrying attachment for bicycles consisting of a relatively-small wheel arranged to travel at one side of the rear bicycle-wheel, a frame which is carried by said relatively-small wheel and upon which is mounted a suitable carrying device, the said attachment having a swinging connection with said bicycle, whereby the said attachment is free to swing up and down independently of the bicycle and about a horizontal and transverse axis which is located at a point adjacent to the axis of the rear bicycle-wheel, substantially as described.

2. In combination with a safety-bicycle, a carrying attachment therefor comprising a wheel arranged to travel at one side of the rear wheel of said bicycle, a forwardly and rearwardly extending frame which is carried by and supported by the said supplemental wheel, a carrying device mounted upon the said frame, an arm which connects the forward end of said frame with the near side of the bicycle-frame, and a second arm which extends around and connects the rear end of said frame with the far side of the said bicycle-frame, substantially as described.

3. A wheeled carrying attachment for bicycles of the safety pattern comprising a relatively-small wheel which is arranged to travel at one side of the rear bicycle-wheel, a horizontally-disposed frame which is supported upon the axle of said supplemental wheel, a carrying device mounted upon said frame at a point directly above the axis of said supplemental wheel, an arm which connects the forward end of said frame with a removable bracket on the near side of the bicycle-frame, and a second arm which extends around and connects said frame with a bracket on the far side of said bicycle-frame.

4. A velocipede comprising a front steering-wheel, a rear driving-wheel, a frame connecting the two wheels, a supplemental wheel arranged to travel at one side of the said driving-wheel, a suitable frame which is mounted upon and carried by the said supplemental wheel, a carrying device mounted upon said frame, an arm which connects the forward end of said frame with the near side of the bicycle-frame, and a second arm which extends around and connects the rear end of said frame with the far side of said bicycle-frame, both arms being connected with the bicycle-frame in such manner that the supplemental wheel swings about a horizontal and transverse axis.

5. A wheeled carrying attachment for bicycles, comprising a wheel, a frame, a box or seat or the like mounted upon the latter, and arms secured to said frame and having pivotal or swinging connections with the bicycle, the connections being such that the carrier is free to swing about a horizontal and transverse axis, and the said wheel occupying a position at the side of the rear bicycle-wheel.

6. A velocipede comprising a front steering-wheel, a frame, a rear driving-wheel, a supplemental wheel arranged alongside the said driving-wheel and having a pivotal or swinging connection with the frame which permits it to swing about a horizontal and transverse axis, and a carrying device mounted upon said supplemental wheel.

HENRY L. HAFF.

Witnesses:
ARTHUR F. DURAND,
AGNES A. DEVINE.